United States Patent [19]

Shiraishi et al.

[11] Patent Number: 4,837,733
[45] Date of Patent: Jun. 6, 1989

[54] SIGNAL PROCESSING METHOD IN AUTORADIOGRAPHY

[75] Inventors: Hisashi Shiraishi, Minami-ashigara; Tsutomu Kimura; Kazuhiro Hishinuma, both of Kaisei, all of Japan

[73] Assignee: Fuji Photo Film Co., Ltd., Kanagawa, Japan

[21] Appl. No.: 883,922

[22] Filed: Jul. 10, 1986

Related U.S. Application Data

[63] Continuation of Ser. No. 568,906, Jan. 6, 1984, abandoned.

[30] Foreign Application Priority Data

Jan. 8, 1983 [JP] Japan ................................ 58-1328
Jan. 8, 1983 [JP] Japan ................................ 58-1329
Jan. 8, 1983 [JP] Japan ................................ 58-1334
Mar. 31, 1983 [JP] Japan ................................ 58-57415

[51] Int. Cl.$^4$ ........................ G01N 33/58; C12Q 1/68
[52] U.S. Cl. ........................... 364/413.13; 364/413.01; 435/6; 935/77
[58] Field of Search ........... 204/180 R, 180 P, 180 G, 204/299 R; 250/458.1, 459.1, 461.1, 374, 375, 388; 435/35, 802, 803, 6; 436/169, 174; 364/413, 414

[56] References Cited

U.S. PATENT DOCUMENTS

Re. 31,847  3/1985  Luckey ........................ 250/327.2
4,239,968  12/1980  Kotera et al. ................. 250/327.100
4,315,179   2/1982  Kato et al. ................... 364/914 X
4,317,318   2/1982  Kato et al. ................... 364/414 X
4,320,415   3/1982  Jones ......................... 382/6 X
4,526,865   7/1985  Silmar ........................ 435/803
4,999,973   1/1985  Horikawa et al. .............. 364/414 X

FOREIGN PATENT DOCUMENTS 0738602  6/1980  U.S.S.R. ....................... 364/413

Primary Examiner—Charles E. Atkinson
Assistant Examiner—Charles B. Meyer
Attorney, Agent, or Firm—Gerald J. Ferguson, Jr.

[57] ABSTRACT

A signal processing method in autoradiography for obtaining information on the one dimensional location of radioactively labeled substances in a sample where the substances of the sample are distributed in at least one row on a support medium where the information is in the form of symbols, numerals or a combination thereof. The method at least includes the steps of (1) generating digital image data where the data comprises sets of digital signals corresponding to the autoradiograph including the row of distributed substances and where the sets of digital signals may respectively represent successive linear portions of the autoradiograph; (2) scanning selected digital signals of the digital image data to generate at least one further signal representative of a predetermined portion of the row of distributed substances where the position of the predetermined portion is at least partially determined by its location in the scanning direction and the amount of radioactively labeled substance at the location is at least partially determined by the amplitude of the further signal; (3) processing the further signal with either or both of smoothing and threshold-processing to detect sampling point corresponding to the location of the predetermined portion of the row of distributed substances; (4) obtaining the image data digital corresponding to the autoradiograph having the locational information on the radioactively labeled substances where the digital image data is obtained by utilizing a radiation image recording and reproducing method of employing a stimulable phosphor sheet. A signal processing method for determining the base sequence of DNA is also disclosed.

33 Claims, 9 Drawing Sheets

000
SIGNAL PROCESSING METHOD IN AUTORADIOGRAPHY

This application is a continuation of Ser. No. 06/568,906, filed 1/6/84 now abandoned.

BACKGROUND OF THE INVENTION

1. Field of the Invention

This invention relates to a signal processing method in autoradiography.

2. Description of the Prior Art

Autoradiography has been known as a method for obtaining locational information on radioactively labeled substances distributed in at least one dimensional direction to form a row on a support medium.

For instance, the autoradiography comprises steps of: labeling organism-originating biopolymers such as proteins or nucleic acids with a radioactive element; resolving the radioactively labeled biopolymers, derivatives thereof, or cleavage products thereof (referred to hereafter as "radioactively labeled substances") on a gel support (support medium) through a resolving process such as electrophoresis to form a resolved pattern of the radioactively labeled substances (the resolved pattern is not visible); placing said gel support and a high-sensitivity type X-ray film together in layers for a certain period of time to expose said film and developing said film to give the autoradiograph of the resolved pattern as a visible image on the film; and obtaining the locational information of the radioactively labeled substances from said visible image. Further, the identification of the polymeric substances, determination of molecular weight of the polymeric substances and isolation of the polymeric substances can be obtained based on the observed locational information. Such autoradiography has been effectively utilized for determining the base sequence of nucleic acids such as DNA or the like.

In the conventional autoradiography utilizing the above-described radiographic process, visualization of the autoradiograph having the locational information on radioactively labeled substances on a radiographic film is essentially required.

Investigators generally analyze the distribution of the radioactively labeled substances on a support medium through study of the visualized autoradiograph. Further, the visually-obtained locational information on the radioactively labeled substances is generally subjected to various analyses to study the characteristics and functions of the radioactively labeled substance.

Since the conventional autoradiography requires visual analysis of the autoradiograph, there is a drawback in that the locational information on the radioactively labeled substances obtained by analysis of the visualized autoradiograph varies or fluctuates depending on the skill of investigators, and the accuracy of the information is limited to a certain extent. Particularly, when the autoradiograph visualized on a radiographic film shows an image of reduced quality (in regard of sharpness, contrast, etc.), satisfactory information can be hardly obtained and the accuracy is low. In order to improve the accuracy of the locational information, for instance, a visualized autoradiograph can be scanned with a device such as a scanning densitometer. However, such a scanning process requires increased operation time and complicated procedures. Further, there is a limitation on the increase of the accuracy obtainable when using the device.

For instance, in carrying out the exposing procedure, the support medium carrying the above-mentioned resolved rows thereon and the radiograph film sometimes cannot be accurately arranged together in layers. In such case, the resolved rows, namely, rows of resolved substances (e.g., electrophoretic rows) visualized on the radiographic film are not parallel to the longitudinal direction of the film and thus give a dislocated pattern. As a result, error is introduced into the visual analysis of the locational information on the radioactively labeled substances to decrease the accuracy thereof.

Further, the rows of the resolved radioactively labeled substances on the support medium are sometimes non-parallel to the longitudinal direction of the support medium or distorted, depending on the kind of support medium or resolving conditions. For instance, a gel support medium is generally held between two glass plates in the resolving procedure because the gel lacks a self-supporting property. As a result, the gel occasionally becomes uneven in the thickness due to deformation of the covers (i.e. the glass plates) and accordingly the radioactively labeled substances are not always resolved uniformly on the gel. The lack of uniformity of the resolved pattern is also caused by air foams contained in the gel or by heterogeneous dispersion of the composition of the gel. For these reasons, a phenomenon known as the so-called smiling effect is often observed. In this phenomenon, the migration distance of the resolved row in the vicinity of the center of the support medium is longer than the migration distances on the both sides thereof. Additionally, in electrophoresis, the voltage sometimes is not applied uniformly to the support medium and in that case the resolving conditions are made locally uneven on the support medium and consequently the resolved rows obtained are distorted.

Furthermore, when radioactively labeled impurities such as natural radioactive materials are contained in the sample, the support medium is contaminated with such radioactive impurities or the resolution conditions are otherwise not appropriate such that a noise sometimes appears on the autoradiograph. In consequence, accurate analysis of the locational information on the radioactively labeled substances becomes difficult, resulting in decrease of accuracy of the desired information.

In the above-described cases, it is not easy to analyze the locational information on the radioactively labeled substances. Thus, even if the aforementioned additional detection device is used, it is still difficult to obtain satisfactorily accurate locational information on the radioactively labeled substances.

SUMMARY OF THE INVENTION

The present inventors have discovered that an autoradiograph having information on the one dimensional location of radioactively labeled substances in a sample can be obtained as a digital image data signal without visualization of the autoradiograph, by utilizing a radiation image recording and reproducing method using a stimulable phosphor sheet in place of the radiographic film employed in conventional radiography. In this method, the digital signal is subsequently subjected to appropriate signal processing to obtain the above locational information in the form of symbols and/or numerals. This method is advantageously applicable to the determination of the base sequence of DNA or DNA fragments to provide ease of operation and high accuracy.

The present invention provides a signal processing method in autoradiography for obtaining information on the one dimensional location of radioactively labeled substances in a sample where the substances are distributed in at least one row on a support medium where the information is in the form of symbols, numerals or a combination thereof, which comprises a process including:

(1) generating digital image data where the data comprises sets of digital signals corresponding to the autoradiograph including the row of distributed substances and were the sets of digital signals respectively represent successive linear portions of the autoradiograph;

(2) scanning selected digital signals of said digital image data to generate at least one further signal representative of a predetermined portion of said one row of distributed substances where the position of said predetermined portion is at least partially determined by its location in the scanning direction and the amount of said radioactively labeled substances at said location is at least partially determined by the amplitude of said further signal;

(3) processing said further signal through either or both of smoothing and threshold-processing to detect at least one sampling point corresponding to the location of said predetermined portion of said one row of distributed substances;

said digital image data being obtained by (a) causing a stimulable phosphor sheet to absorb radiation energy emitted by said radioactively labeled substances on the support medium to record the autoradiograph of the radioactively labeled substances on the stimulable phosphor sheet, (b) scanning said stimulable phosphor sheet with an electromagnetic wave to release at least a portion of radiation energy stored in said phosphor sheet in the form of the autoradiograph as stimulated emission, (c) detecting said stimulated emission photoelectrically and (d) converting the detected stimulated emission into said digital image data.

The present invention also provides a signal processing method in autoradiography, which comprises steps of:

scanning the digital image data in at least two different positions in such a manner that each scanning selects certain ones of said digital signals corresponding to the row of distributed substances to obtain relationships between positions of said certain ones of the digital signals in the direction of the scanning and the signal levels at said positions;

generating two distributed point signals based on said relationships where the two distributed point signals are generated for said row of distributed substances, the two distributed point signals respectively corresponding to the two different scanning positions and where said two distributed points are disposed on said row; and generating a signal corresponding to a continuous line selected from the group consisting of a straight line, a curved line and a polygonal line connecting said points on the row where said continuous line corresponds to a scanning line for detection of sampling points respectively corresponding to the locations of said substances, scanning said digital image data along said scanning line to obtain locational information signals representative of said locational information for each of said substances in said sample, in which said digital image data is obtained in the same manner as above.

BRIEF DESCRIPTION OF DRAWINGS

FIG. 12-(c) is a graph for the fifth row showing a relationship between position on the scanning line and level of digital signal in said position and obtained by subtraction between the graphs (a) and (b).

DETAILED DESCRIPTION OF THE INVENTION

Figure 1:
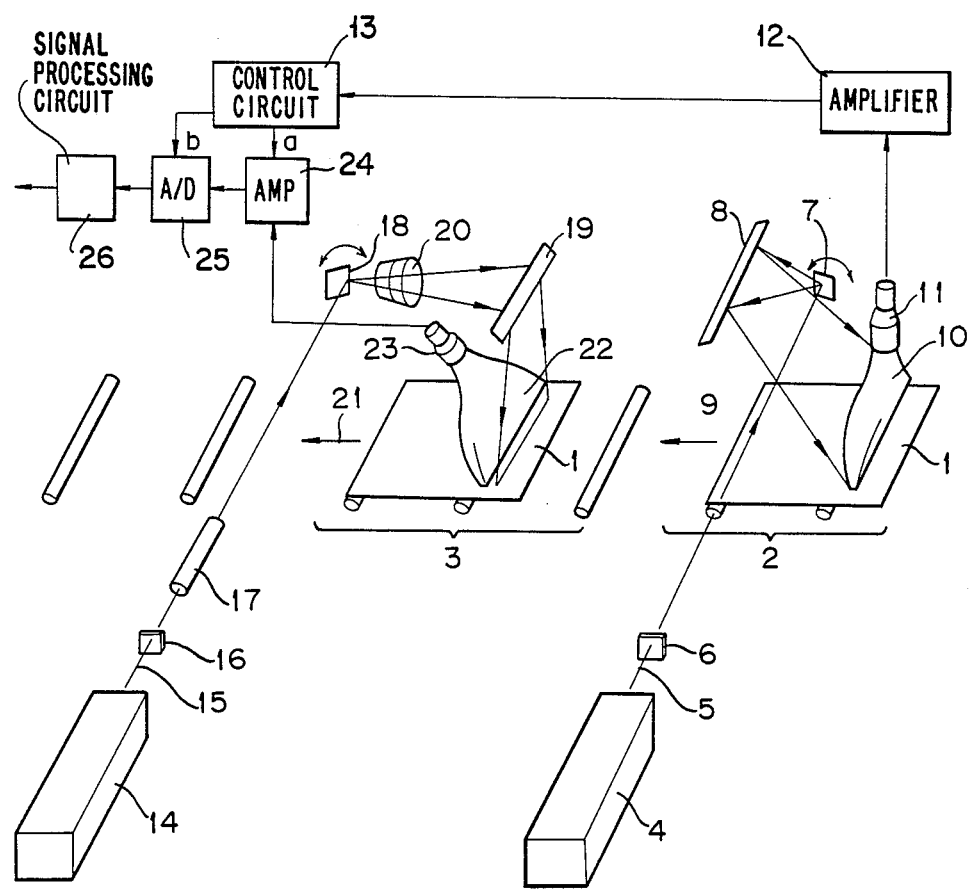
FIG. 1 shows an example of a read-out system for reading out or detecting the locational information of the radioactively labeled substances copied from the sample and stored in a stimulable phosphor sheet employable in the present invention.

The present invention utilizes a radiation image recording and reproducing method which comprises the steps of: causing a stimulable phosphor of a stimulable phosphor sheet to absorb radiation energy having passed through an object or having been radiated by an object; exciting the stimulable phosphor with an electromagnetic wave such as visible light or infrared rays (hereinafter referred to as "stimulating rays") to sequentially release the radiation energy stored in the stimulable phosphor as light emission; photoelectrically detecting the emitted light to provide electric signals; and converting the electric signals to digital signals through A/D conversion.

Details of the above-mentioned radiation image recording and reproducing method is described in, for instance, U.S. Pat. No. 4,239,968.

The stimulable phosphor sheet contains a stimulable phosphor such as a divalent europium activated alkaline earth metal fluorohalide phosphor. When exposed to a radiation such as X-rays, $\alpha$-rays, $\beta$-rays, $\gamma$-rays, or ultraviolet rays, the stimulable phosphor absorbs a portion of the radiation energy and then emits light (stimulated emission) corresponding to the radiation energy stored therein upon excitation with an electromagnetic wave (stimulating rays) such as visible light or infrared rays, after the exposure.

Accordingly, in the present invention, the location information on the radioactively labeled substances can be directly obtained as digital signal without visualization by applying thereto the above-mentioned radiation image recording and reproducing method to the autoradiograph.

In the present invention, the term "locational information" of the radioactively labeled substances includes a variety of information relating to the location of the radioactively labeled substances, or the aggregation thereof, being present in the sample, such as the location, the shape, the concentration, the distribution and combination thereof.

According to the present invention, the one dimensional distribution (resolution) direction of a row of radioactively labeled substance can be detected automatically to determine a scanning line for detection of sampling points corresponding to the locations of the substance along the row, even if there occurs overall distortion of the row due to dislocation of certain substances within the row of the autoradiograph copied on the stimulable phosphor sheet which is brought about by (a) locational distortion of the resolved row of radioactively labeled substances on the support medium in the course of the resolution process, or (b) locationally inaccurate arrangement between the support medium carrying the row of radioactively labeled substances thereon and the stimulable phosphor sheet in the course of the copying (i.e., exposing) and storing procedure of the autoradiograph in the phosphor sheet. Based on the thus determined scanning line, the locational information on row of the distributed radioactively labeled substances (referred to herein as a "distributed row") can be obtained with high accuracy. Furthermore, when the autoradiograph is composed of a plurality of rows of radioactively labeled substances direction, the one dimensional distribution direction of each distorted row can be accurately detected to determine the scanning line for each row.

In the present invention, the term "distributed row" means a row which comprises radioactively labeled substances scattered or distributed in one direction in the form of bands or spots, such as an electrophoretic row obtained through electrophoresis. The term "digital image data" means sets of digital signals corresponding to the autoradiograph of the radioactively labeled substances.

Further, even if the autoradiograph of a sample contains noise, it is possible to easily remove only the noise from the autoradiograph so as to obtain proper image data, by subjecting the corresponding digital image data to specific signal processing according to the present invention. In more detail, the locational information of the sample can be obtained with high accuracy, being free from the adverse effect of noise which has been introduced by radioactively labeled impurities contained in the sample or improper resolution conditions. Moreover, if a reference row (internal reference row) is provided for the radioactively labeled substances under analysis, the detection of the location thereof can be further easily performed with high accuracy.

The reference row (internal reference row) in the present invention means, for instance, a resolved row composed of a mixture of four kinds of base specific cleavage products obtained by specifically cleaving DNA, to facilitate the determination of the base sequence of DNA or a DNA fragment. The reference row is employed as reference in signal processing for obtaining the locational information on the radioactively labeled substances in other resolved rows. The reference row does not necessarily consist of a resolved row, and can be synthesized from plural resolved rows as part of the signal processing.

Furthermore, the distributed (e.g., resolved) portions of the radioactively labeled substances, namely the sampling points, are automatically detected on the digital image data, and it is possible to analyze the locations of distributed portions with high accuracy even if the size of each distributed portion thereof is reduced. This means that the absolute amount of the radioactively labeled substances used in one autoradiographic process can be reduced, or that the resolved rows formed on a single support medium can be increased in the number without broadening the width of a support medium, so that the amount of information obtainable in single autoradiographic process can be increased as compared with the case employing the conventional autoradiography.

Examples of samples employable in the present invention include a support medium on which radioactively labeled substances are distributed (e.g., resolved) in at least one one dimensional direction to form a distributed row (e.g., resolved row). Examples of radioactively labeled substances include biopolymers, derivatives thereof, or cleavage products of either said biopolymers or said derivatives, labeled with a radioactive element.

For instance, in the case that the radioactively labeled biopolymers are polymeric substances such as protein, nucleic acid, derivatives of the protein or nucleic acid or cleavage products of either the protein, the nucleic acid or their derivative, the present invention is useful for isolation and identification thereof. Further, the present invention can be effectively used to analyze the whole or partial molecular structures of these biopolymers or basic segmental constitutions thereof.

Representative examples of the method for resolving (or developing) the radioactively labeled substances on a support medium include electrophoresis using one of various resolving mediums such as a gel in the form of layer, column or the like, a molded polymer film such as a cellulose diacetate film, and a filter paper, and thin layer chromatography using a support material such as silica gel. However, the method employable in the present invention is by no means restricted to these methods.

Samples employable in the present invention are by no means restricted to the above-mentioned samples and any other samples can be used, provided that the sample is a support medium containing the radioactively labeled substances distributed one-dimensionally thereon and the autoradiograph having the locational information of the substances can be recorded on the stimulable phosphor sheet.

The stimulable phosphor sheet used in the present invention has a basic structure comprising a support, a phosphor layer and a transparent protective film. The phosphor layer comprises a binder and a stimulable phosphor dispersed therein, and for instance, it is obtained by dispersing particulate divalent europium activated barium fluoride (BaFBr:Eu2+) phosphor particles in a mixture of nitrocellulose and a linear polyester. The stimulable phosphor sheet is, for example, prepared by providing the above-mentioned phosphor layer onto the support such as a polyethylene terephthalate sheet and then providing a protective film such as a polyethylene terephthalate sheet on the phosphor layer.

In carrying out the exposing procedure, that is, the procedure of storing the radiation energy released from the support medium containing the radioactively labeled substance in the stimulable phosphor sheet, at least a portion of the released radiation energy is absorbed in the stimulable phosphor sheet by placing the support medium and stimulable phosphor sheet together in layers for a certain period of time. The exposure can be accomplished by keeping the phosphor sheet in a position adjacent to the support medium, for instance, at room temperature or a lower temperature for at least several seconds.

Detailed description on the stimulable phosphor sheet and the exposing procedure employable in the invention is given in Japanese Patent Application No. 57(1982)-193418 (U.S. patent application filed on Nov. 7, 1983 corresponding thereto, and European Patent Application No. 83 110 984.8).

A method for reading out or detecting the information on the one dimensional location of the radioactively labeled substances in a sample copied and stored in a stimulable phosphor sheet according to the invention will be described briefly, referring to an embodiment of a read-out system shown in FIG. 1 of the accompanying drawings.

FIG. 1 schematically illustrates an embodiment of the read-out system comprising a preliminary read-out section 2 for preliminarily reading out the one dimensional information on the location of the radioactively labeled substances stored (or recorded) in the stimulable phosphor sheet 1 (from which the sample generally has been removed; the stimulable phosphor sheet is hereinafter referred to as "a phosphor sheet"), and a final read-out section 3 for finally reading out the desired locational information on the radioactively labeled substances stored in the phosphor sheet 1.

In the preliminary read-out section 2, the preliminary read-out operation is carried out in the following manner.

Laser beam 5 generated by a laser source 4 first passes through a filter 6 to cut off the wavelengths corresponding to the wavelength region of stimulated emission to be emitted from the phosphor sheet 1 in response to stimulation with the laser beam 5. The laser beam 5 is subsequently deflected by a beam deflector 7 such as a galvanometer mirror, and reflected by a plane reflecting mirror 8. The deflected beam then impinges upon the phosphor sheet 1. The laser source 4 used herein may also be so selected as to avoid overlapping of the wavelength region of the laser beam 5 with the main wavelength region of the stimulated emission to be emitted from the phosphor sheet 1.

The phosphor sheet 1 is transferred in the direction along the arrow 9 under the irradiation of the above-mentioned deflected laser beam. Therefore, the whole surface of the phosphor sheet 1 is subjected to the irradiation of the deflected laser beam. The power of the laser beam 5 employed in the preliminary read-out section is adjusted to be lower than the power of the laser beam employed in the final read-out section by controlling the output of the laser source 4, the beam diameter of the laser beam 5, the scanning speed of the laser beam 5, and the transfer speed of the phosphor sheet 1.

When irradiated with the above-mentioned laser beam, the phosphor sheet 1 gives stimulated emission having an emission intensity proportional to the radiation energy stored (or recorded) therein. The emission then enters into a light guiding sheet 10 for the preliminary read-out. The light guiding sheet 10 has a linear edge face for receiving the emission, and the edge face is so positioned in the vicinity of the phosphor sheet as to correspond to the scanning line on the phosphor sheet 1. The exit of the light guiding sheet 10 is in the form of a ring and is connected to a light-receiving face of a light detector 11 such as a photomultiplier. The light guiding sheet 10 is made, for instance, by processing a sheet of a transparent thermoplastic resin such as an acrylic synthetic resin, and so constituted that the emission introduced from the linear edge face is transmitted to the exit under repeated total reflection within the sheet 10. The stimulated emission from the phosphor sheet 1 is guided in the interior of the light guiding sheet 10 to the exit, and received by the light detector 11.

The preferable shape and material of the light guiding sheet is disclosed in Japanese Patent Provisional Publications No. 55(1980)-87970 and No. 56(1981)-11397.

On the light-receiving face of the light detector 11 is provided a filter which allows only the light of wavelength region of the stimulated emission to pass through and cuts off the light of the wavelength region of the stimulating rays (laser beam) so as to detect only the stimulated emission. The stimulated emission detected by the light detector 11 is converted to an electric signal, amplified in an amplifier 12 and transmitted to the output. The stored information output from the amplifier 12 is supplied to a control circuit 13 of the final read-out section 3. The control circuit 13 provides an amplification degree setting value a and a scale factor setting value b, for obtaining a signal having a suitable level according to the detected information.

The phosphor sheet 1 having been subjected to the preliminary read-out in the above-described manner is then transferred to the final read-out section 3.

In the final read-out section 3, the following read-out operation is performed.

The laser beam 15 generated by a laser source 14 for the final read-out passes through a filter 16 having the same function as that of the above-mentioned filter 6, and then the beam diameter is precisely adjusted in a beam expander 17. Subsequently, the laser beam is deflected by a beam deflector 18 such as a galvanometer mirror, and reflected by a plane reflection mirror 19. The deflected beam then impinges one-dimensionally upon the phosphor sheet 1. Between the beam deflector 18 and the plane reflection mirror 19 a $f\theta$ lens 20 is provided so that the beam speed is continuously kept constant when the deflected laser beam is scanned on the phosphor sheet 1.

The phosphor sheet 1 is transferred in the direction along the arrow 21 under the irradiation with the above-mentioned deflected laser beam. Accordingly, the whole surface of the phosphor sheet is subjected to the irradiation in the same manner as in the preliminary read-out operation.

When irradiated with the above-mentioned laser beam, the phosphor sheet 1 gives stimulated emission in proportion to the radiation energy stored therein in the same manner as in the preliminary read-out operation. The emission then enters into a light guiding sheet 22 for the final read-out. The light guiding sheet 22 for the final read-out is made of the same material and has the same constitution as the light guiding sheet 10 employed for the preliminary read-out. The stimulated emission received is guided in the interior of the light guiding sheet 22 up to the exit under repeated total reflection, and then received by a light detector 23. On the light-receiving face of the light detector 23 is provided a filter which allows only the light of wavelength region of the stimulated emission to pass through and cuts off the light of the wavelength region of the stimulating rays (laser beam) so as to detect only the stimulated emission. The stimulated emission detected by the light detector 23 is converted to an electric signal, amplified to an electric signal adjusted to an appropriate level in an amplifier 24 according to the aforementioned amplification degree setting value a and transmitted to an A/D converter 25. The adjusted electric signal is then converted to a digital signal in the A/D converter 25 according to an appropriate scale factor defined by the scale factor setting value b.

From the foregoing, it can be seen the digital image data outputted from converter 25 comprises sets of digital signals corresponding to the autoradiograph recorded in the stimulable phophor where the sets of digital signals respectively represent successive linear portions of the autoradiograph.

In the above description on the method for reading out the locational information on the radioactively labeled substances copied and stored in the stimulable phosphor sheet, a read-out operation involving both the preliminary read-out operation and the final read-out operation has been given. However, the read-out operation employable in the present invention is not limited to the above-described embodiment. For instance, the preliminary read-out operation may be omitted if the content of the radioactive substances in the sample and an adequate exposure time for the sample are previously known.

Further, other suitable methods than the above-mentioned embodiments may be used for reading out the locational information of the radioactively labeled substances copied from the sample and stored in the stimulable phosphor sheet.

The thus obtained sets of digital signals corresponding to the autoradiograph of the radioactively labeled substances are subsequently input into a signal processing circuit 26 shown in FIG. 1. In the signal processing circuit 26, the above-mentioned scanning line is determined and then the sampling points are detected on said digital signals, as will be described in further detail below. Each digital signal is provided with an address (X, Y) which is represented in a coordinate system fixed to the stimulable phosphor sheet and further provided with a signal level (Z) in its address which corresponds to the intensity of stimulated emission at the point corresponding to the address.

In the signal processing method of the present invention, the sets of digital signals obtained by reading out the information as the light emitted from the stimulable phosphor sheet, namely the digital image data are stored temporarily in a memory device of the signal processing circuit 26 (that is, stored in a non-volatile memory unit such as a buffer memory, a magnetic disk, etc.). In the signal processing, the scanning on the digital image data means to selectively pick up only the signal in the scanning area from the memory device.

As stated above, the signal processing circuit 26 may include a memory where the organization of the memory may correspond to a coordinate system fixed to the sheet as indicated above. Thus, the first entry (Y coordinate) of the memory may contain a first linear portion of the autoradiograph where each entry will contain a number of locations in the X direction. Stored in each location (where each location is identified by the address (X,Y)) is a digital signal representative of the magnitude or level of the signal emitted from the phosphor at the point (X,Y) on the sheet. Since the sets of digital signals respectively corresponding to the successive linear portions of the autoradiograph are respectively stored in successive entries of the memory, all addresses (X,Y) of the memory will contain level information regarding all locations of the autoradiograph after the memory is filled. Of course, many, if not most, of the addresses will contain level information on the background of the autoradiograph while the other addresses will contain level information corresponding to the radioactively labelled substances.

Figure 2:
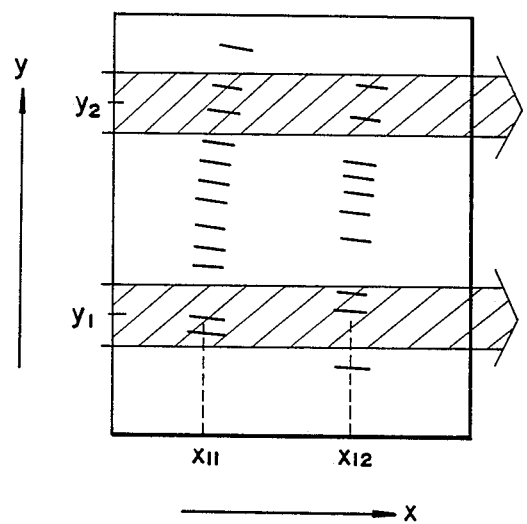
FIG. 2 shows an example of an autoradiograph copied from a sample and stored in a stimulable phosphor sheet, in which radioactively labeled substances are resolved on a support medium and how digital image data representative of the autoradiograph is scanned at at least two different positions.

As stated above, the digital image data is scanned and by this is meant that certain entries are of the memory are selected to determine the contents thereof. Thus, assuming there are 50 entries in the Y direction, possibly only entries 10-15 and 35-40 will be selected for scanning. This scanning is illustrated in FIG. 2 where the centers of the scannings occur at the memory entries corresponding to $Y_2$ and $Y_1$. The purpose of the scanning of the digital data is to locate the rows of radioactively labelled substances where two vertically oriented rows of such substances are illustrated in FIG. 2 and where, in each row, a plurality of radioactively labelled substances are indicated by bands. Note the rows are not perfectly vertical due to distortion thereof as discussed above. However, by scanning the digital signals, as described above, certain ones of the digital signals corresponding to each row of substances can be detected (due to the larger magnitude (or greater level) thereof) and selected as indicating the location of each row and thus compensate for the row distortion.

The digital signal processing according to the present invention further is described below, referring to the example of the FIG. 2 autoradiograph of radioactively labeled substances resolved on a support medium through electrophoresis or the like.

In the first step, the scanning lines of FIG. 2 for the detection of sampling points are determined in the manner as described below.

As state above, FIG. 2 shows an example of an autoradiograph of a sample copied onto a stimulable phosphor sheet, in which the autoradiograph is composed of a plurality of radioactively labeled substances resolved in the longitudinal (or vertical) direction of the support medium to form two resolved rows. The autoradiograph on the stimulable phosphor sheet is distorted as shown in FIG. 2 due to an inaccurate operation such as incorrect arrangement of the support medium and stimulable phosphor sheet in the course of the copying (exposing) process.

Sets of digital signals (digital image data), corresponding to the FIG. 2 autoradiograph, are obtained by reading out the stimulable phosphor sheet carrying the autoradiograph and applied to by the signal processing circuit 26.

In FIG. 2, when the vertical direction is referred to as the Y-axis direction and the horizontal direction is referred to as the X-axis direction in the stimulable phosphor sheet, scanning lines of FIG. 2 can be determined by the following steps according to the present invention.

In the first place, the digital image data of selected entries of the memory are scanned numerically in the X-axis direction in such a manner that the scanning traverses the one dimensional distribution direction of the radioactively labeled substances, namely, in a manner that the scanning traverses the distributed rows thereof, and thereby, a relationship between the positions (X) of certain ones of the digital signals corresponding to the rows in the selected entries of the memory scanning and the signal levels (Z) thereof at those positions are obtained.

Figure 3A:
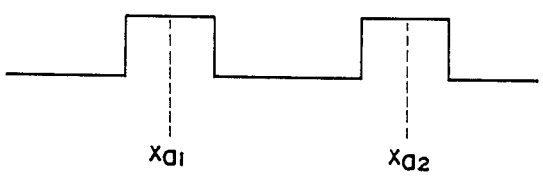
FIGS. 3-(a) and 3-(b) are graphs both showing relationships between position in the scanning and level of digital signal in said position as a result of the scanning of FIG. 2.
Figure 3B:
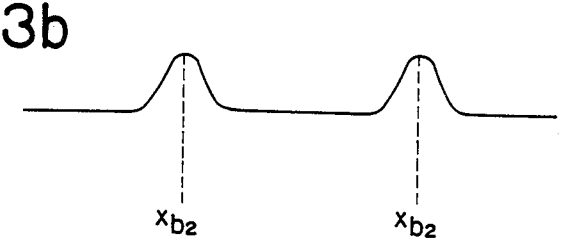

Upon plotting the positions (X) on the scanning against abscissa and the signal level (Z) against ordinate, a graph such as shown in FIG. 3-(a) is prepared.

FIG. 3-(a) is a graph of the signal obtained by the scanning on the digital image data corresponding to the autoradiograph shown in FIG. 2, where the radioactively labeled substances are resolved in the form of bands with a certain width.

In the graph of FIG. 3-(a), a middle point ($X_{am}$) in each region where the signal exhibits a maximum level is assigned to a distributed point of the radioactively labeled substances on each distributed row, wherein a is a positive integer and represents the scanning number (indicating the order of the scanning operation of FIG. 2; in this case, a=1 or 2), and m is a positive integer and represents the number of the distributed row. That is, the point $X_{am}$ means a distributed point of the radioactively labeled substances which is detected by the a-th scanning and is present on the m-th distributed row.

The scanning is carried out at least twice in different positions on the digital image data, namely at different Y-corrdinates. Subsequently, a graph such as shown in FIG. 3-(a) is produced imaginarily for each scanning where the imaginary graph corresponds to electrical signals which are obtained as a result of the scanning of the digital data in the memory. Two or more of sets of distributed points of the radioactively labeled substances are determined on the graph.

$$\{(X_{a1}, X_{a2}), a=1, 2, \ldots\}$$

In the second place, a straight line (or polygonal line) which joins the distributed points with the same number m in series of a is prepared for each distributed row and assigned to a scanning line for the detection of sampling points. Of course, a least a square straight line or curved line connecting the distributed points may be assigned to the scanning line for detecting sampling points.

Figure 6:
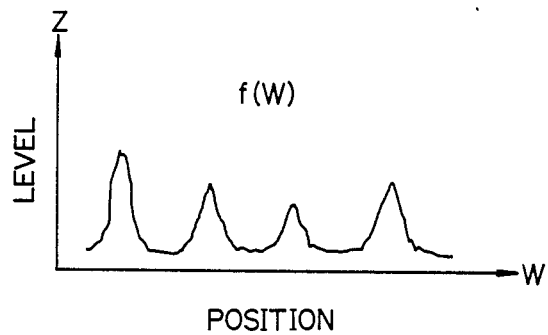
FIG. 6 shows an example of a graph indicating relationships between position in the scanning and the level of the digital signals in said positions.

The above scanning lines represent further scans of the digital signals stored in the memory, the scan directions this time being in the directions of the rows of radioactively labelled substances of FIG. 2. Referring to the first row, it can be seen the horizontal scans at the $Y_1$ and $Y_2$ coordinates detect two points (or two distributed points since they are distributed along the first row). The location of the remaining points on the row can be approximated by connecting them with a scan line which may be straight or curved. Of course, these remaining points correspond to particular (X,Y) addresses of the memory and once these addresses are determined, the digital signals in the memory can be scanned using the addresses to detect the location of the sampling points, that is, the location of radioactively labelled substances disposed along the scanned row, as is illustrated in FIG. 6, discussed below.

More specifically for instance, in the case where the two set of distributed points of the radioactivley labeled substances of FIG. 2 (represented as below) are found by scanning at the two Y-coordinates ($Y_1$ and $Y_2$) in parallel to the X-axis:

$$\{(X_{11}, X_{12}), (X_{21}, X_{22})\}$$

a straight line which joins the two distributed points of ($X_{11}$, $Y_1$) and ($X_{21}$, $Y_2$) is assigned to the scanning line for the detection of sampling points for the first distributed row. The scanning line for the second distributed row is prepared as a straight line joining the two distributed points of ($X_{12}$, $Y_1$) and ($X_{22}$, $Y_2$) in the same manner as mentioned above.

The scanning operation of FIG. 2 along the X-axis direction can be carried out in any position on the Y-axis. In the case that the scanning line for the detection of sampling points is determined by two scannings, namely by finding two distributed points, the distance between the two scanning positions on the Y-axis is preferably set that the scanning line to be determined coincides with the real distributed row as accurately as possible. That is, the top end (or vicinity thereof) and bottom end (or vicinity thereof) of the resolved row of the radioactively labeled substances are desirably selected as the scanning positions. The scannings are not necessarily done in parallel to each other, but scannings in parallel are naturally preferred.

The above-mentioned scanning of FIG. 2 is required to have such a width as to catch at least one resolved portion (band or spot, etc.) of the radioactively labeled substances for each distributed row. Thus, the scanning is done on the digital image data in memory with a certain width having its scanning center along the Y-axis direction where the width of the scan means that the number of memory entries selected for each scan must be sufficient in number to encompass (or catch) at least one resolved portion. If the scanning width is excessively small, it is possible that the scanning not only doesn't encompass a resolved portion (i.e., portion in which a resolved radioactively labeled substance is present), it is also possible that, even if the scanning catches a part of the resolved portion, the detected distributed point may include an error if the distribution of the radioactively labeled substances on that portion deviates to a certain extent. If the scanning width is excessively wide, the detected distributed point of the radioactively labeled substances may be inaccurate. Accordingly, it is desirable that the scanning width be predetermined depending on the conditions of the sample.

The graph of the signal shown in FIG. 3-(a) is obtained, for instance, by picking up the digital signals within a certain scanning width and summing the levels thereof for each X-coordinate. The summed data may be further subjected to threshold processing so as to reduce noise. Otherwise, the graph is obtained by repeatedly picking up the digital signals within the scanning width, applying threshold processing to the signals for each Y-coordinate, and summing the applied signals for each X-coordinate. The Y-coordinate of the scanning is represented by a middle point of the scanning width.

The threshold processing mentioned herein means a two-valued (i.e., binary) processing, that is, the level of digital signal being equal to a certain level (the threshold value) or higher than said value is assigned to 1, while the level of digital signal which is lower than said value is assigned to 0, whereby representing all levels of digital signals by 1 or 0.

Otherwise, the above-mentioned scanning can be carried out as follows. The digital signal within the scanning width is picked up repeatedly for each Y-coordinate to find out the X-coordinate $X_{ai}$ at which the signal exhibits a maximum level for each Y-coordinate (using a graph such as shown in FIG. 3-(a)), and subsequently the local mean X-coordinate $X_{a1}$ is calculated.

$$X_{a1} = \sum_{i}^{N} X_{ai}/N$$

The Y-coordinate $Y_1$ is found by averaging Y-coordinates which provide $X_{ai}$ included within a certain precision range of $X_{a1}$. Then, both coordinates are assigned to the above-mentioned distributed point $(X_{a1}, Y_1)$.

The above-mentioned scanning position and scanning width may be manually input in the signal processing circuit 26 for each sample prior to the signal processing of the digital signal. By predetermining the scanning position and scanning width independently for each sample as described above, the distributed points of the radioactively labeled substances can be detected accurately even if the distribution in the one dimensional direction thereof varies greatly depending on the kind of sample and the resolution conditions, etc.

Scanning more than twice increases the detected distributed points of the radioactively labeled substances. In this case, a straight line (polygonal line) obtained by joining the distributed points, which becomes the scanning line for the detection of sampling points, fits more closely to the distributed row thereof. Further, by processing the polygonal line with a suitable approximation to prepare a curved line, the scanning line for the detection of sampling points can be determined more accurately. However, this increase in the number of steps the scanning operation brings about complexity and increased processing time in the signal processing. It is preferable that the number of scans be determined depending on the conditions of the sample and the accuracy desired in the autoradiographic process.

For instance, in the autoradiography of a sample in which nucleic acids, derivatives thereof or cleavage products of the nucleic acids or the derivatives thereof, labeled with a radioactive element, are resolved on a support medium through a conventional method using electrophoresis or the like, the scanning line for the detection of sampling points can be determined accurately with two scans. The scanning width is preferably so predetermined as to catch two or three distributed portions (resolved bands) of the radioactively labeled substances for each resolved row.

According to the above-described determination of the scanning line for the detection of sampling points, it is possible that the width of respective distributed portions of the radioactively labeled substances is reduced to approx. 3 mm. Therefore, the present invention permits reduction of the amount of the radioactively labeled substances needed for the preparation of resolved rows and consequently, makes it possible to increase the number of rows resolvable in a single support medium.

In the signal processing method of the present invention, a distributed point of the radioactively labeled substances in each scanning area can be more easily detected by utilizing a graph which is imaginarily obtained through the differentiation of the graph of FIG. 3-(a). That is, the signal of FIG. 3-(a) may be differentiated to facilitate detection of the distributed point for a particular distributed point included with one of the scans of FIG. 2. In More detail, edges of the resolved row can be emphasized by differentiating the signal and consequently the both edges in the width direction of the resolved row can be easily detected, the distributed point of the radioactively labeled substances being detected by simply finding the middle point between the both edges.

Figure 4A:
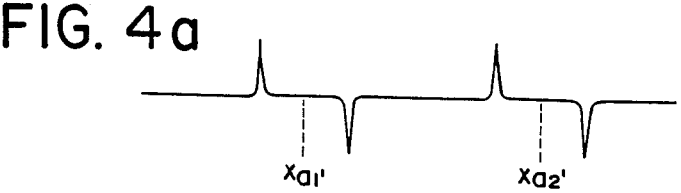
FIGS. 4-(a) and 4-(b) are graphs obtained by differentiating the graphs of FIGS. 3-(a) and 3-(b), respectively.
Figure 4B:
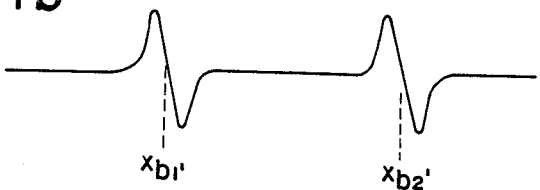

The graph of FIG. 4-(a) shows a signal which is obtained by differentiating the signal of FIG. 3-(a). From the signal of FIG. 4-(a), the edges of each resolved row can be easily detected and thus the distributed points of the radioactively labeled substances in each row are determined by determining each middle point $(X_{am}')$ between a positive peak of the differentiated signal and a negative peak thereof.

In the case where the radioactively labeled substances are resolved in the form of spots in which the resolved row is liable to exhibit remarkable dislocation or distortion, or in the case where the above-mentioned scanning conditions (scanning position and scanning width) are not suitably predetermined, a signal with position (X) on the scanning line and signal level (Z) is obtained as shown in FIG. 3-(b).

In the graph of FIG. 3-(b), each point $(X_{bn})$ at which the signal exhibits a maximum level is assigned to a distributed point of the radioactively labeled substances in each resolved row, wherein b is a positive integer and represents the scanning number, and n is a positive integer and represents the row number.

The graph of FIG. 4-(b) shows a signal which is obtained by differentiating the signal of FIG. 3-(b). From the graph of FIG. 4-(b), each middle point $(X_{bn}')$ where the differentiated level value changes from positive to negative can be assigned to a distributed point of the radioactively labeled substances in each resolved row.

In the above cases, the scanning line for the detection of sampling points can be also determined using the detected distributed points in the same manner as described above.

In examples shown in FIGS. 2 through 4, the processing is described for cases of the distributed pattern having two distributed rows, but the signal processing method for determining the scanning line of the present invention is by no means restricted to the case involving the just two rows, but the method can be applied to the distributed pattern of the radioactively labeled substances such as a pattern having only one row, or a pattern having plural (three or more) rows.

In the second step, the sampling points for detecting the distributed portions of the radioactively labeled substances are detected, for example, as described below referring to another example of the autoradiograph.

Figure 5:
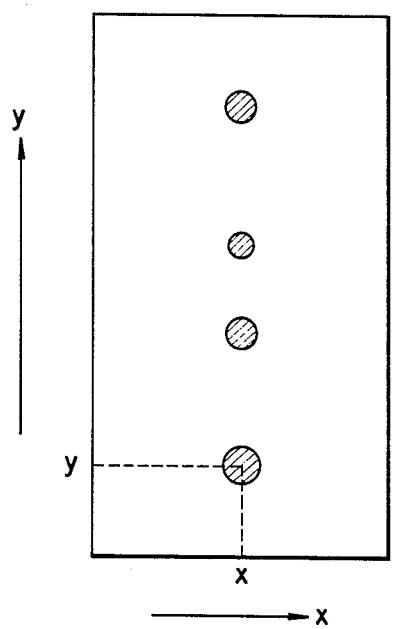
FIG. 5 shows an example of the autoradiograph of a sample in which radioactively labeled substances are resolved in a one dimensional direction on a support medium.

FIG. 5 shows an example of the autoradiograph of a sample in which radioactively labeled substances are distributed in one dimensional direction.

The digital signals corresponding to the autoradiograph of the sample are obtained in the manner described above. Concerning the digital signal, the scanning line for detecting the sampling points can be determined as described above, that is for example, by scanning the digital image data in two different positions in such a manner that the scanning traverses the one-dimensional resolved row of the radioactively labeled substances; detecting two distributed points thereof on said scanning; and joining said two distributed points to give a straight line.

The scanning along the scanning line is performed on the digital image data. As a result, a signal is obtained in which the position (W) of each substance on the scanning line and the signal level (Z) associated therewith is as shown in the graph of FIG. 6. The scanning is done with a certain width. That is, the summation of the digital signal levels for each W-coordinate within the scanning width are plotted against the abscissa in the graph.

Figure 7:
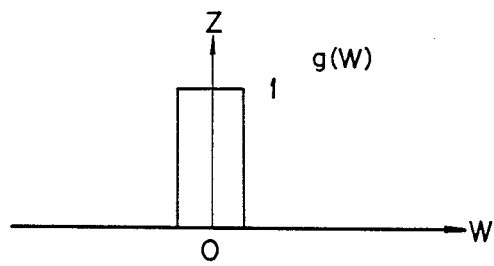
FIG. 7 shows an example of the filter function employable for smoothing.

Subsequently, the signal is smoothed, for instance, by convolution of the signal graph using a suitable filter function. Representative examples of the filter function employable for the convolution include a function g(W) graphically shown in FIG. 7. When the signal shown in FIG. 6 is represented with a function f(W), the following smoothed function h(W) is obtained by the convolution operation with the above-mentioned filter function:

$$h(W) = g(W) * f(W)$$

wherein * is the convolution operator. Thus, a signal as shown in the graph of FIG. 8 is obtained.

Figure 8:
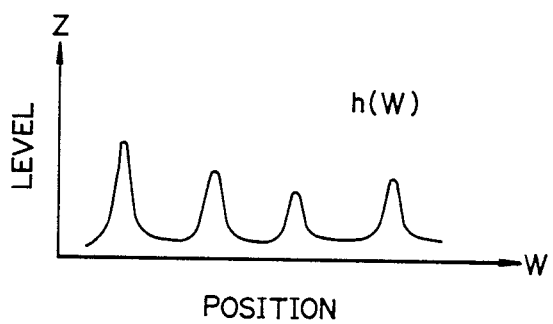
FIG. 8 is a graph obtained by processing the graph of FIG. 6 with the smoothing of FIG. 7.

Further, the frequency of occurrence of the various levels of the signal of FIG. 8 may be determined to obtain a histogram that is, a histogram with respect to the digital signal on the above-mentioned scanning line with a certain scanning width. The histogram is preferably smoothed by convolution in the manner as described above.

Figure 9:
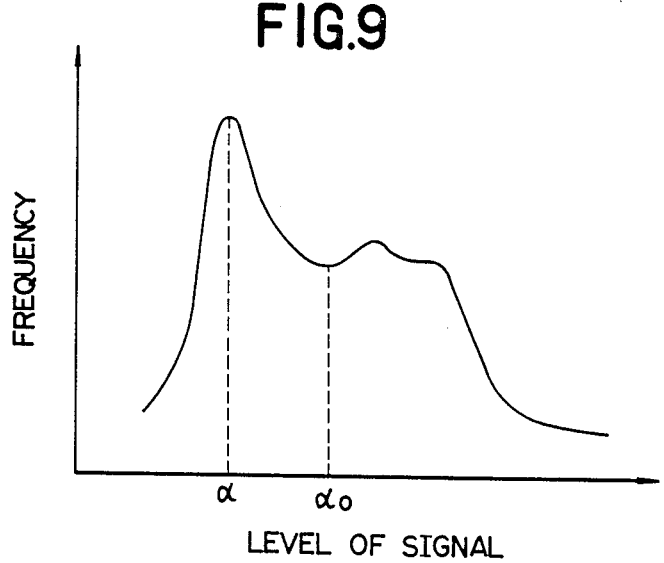
FIG. 9 shows a histogram corresponding to FIG. 8.

FIG 9 shows a smoothed histogram corresponding to the signal shown in FIG. 6. The peak point ($\alpha$) in the histogram of FIG. 6 represents the background level of the digital signal. A certain value is added to the signal level ($\alpha$) and the summed value ($\alpha_0$) is assigned to a threshold value.

The signal of FIG. 8 is subjected to threshold processing based on the obtained threshold value ($\alpha_0$). In more detail, a digital signal level which is equal to the threshold value or higher than said value is assigned to 1, while a signal level which is lower than said value is assigned to 0, so as to obtain a signal in which the signal level is represented by 1 or 0. In this graph, all middle points in regions in which the signal level equals 1 are assigned to sampling points.

In the signal processing method of the present invention, all maximum points shown in the smoothed signal of FIG. 8 can be assigned to the sampling points.

Thus, the sampling points $S_m$ having the positions $(W_m)$ in the distributed direction of the radioactively labeled substances are determined, wherein m is a positive interger and represents the number of a sampling point. The information on the one dimensional location of the radioactively labeled substances is represented by the position $(W_m)$ in the one dimensional direction by applying the signal processing to the digital signal as mentioned above.

Further, if the starting position for resolving the radioactively labeled substances is recorded on the stimulable phosphor sheet with a marker containing a radioactive element, the starting position ($W_0$) can be detected on the digital image data in the manner as described above. Otherwise, the starting position can be also be detected mechanically by punching into the stimulable phosphor sheet a perforation and setting the starting position with respect thereto in the exposing procedure. Therefore, the locational information ($W_m$) can be represented by the migration distance ($W_m'$) from the starting position of resolution where $W_m' = W_m - W_0$.

Furthermore, when the signal level on each maximum point in the signal of FIG. 8 is assumed to correspond to the relative amount (concentration) of the radioactively labeled substances in each resolved portion, the one-dimensional information on the location of radioactively labeled substances may be represented by both the migration distance and relative amount ($W_m'$, $Z_m$). For the relative amount, various calculations such as integration in the vicinity of the each maximum point in the signal of FIG. 8 can be done.

The autoradiograph having the information on one dimensional location of the radioactively labeled substances is output from the signal processing circuit 26 in the form of numerals or symbols as mentioned above. The locational information, which is obtained as the coordinates of the sampling point $S_m$ and the signal level at those coordinates ($X_m$, $Y_m$, $Z_m$), are by no means limited to the above-mentioned representation modes, and other optional representative modes are also utilizable. Thus, the locational information on the radioactively labeled substances can be obtained in the form of symbols and/or numerals as stated above.

The obtained symbol and/or numeral are transmitted to a recording device (not shown), directly or optionally via storage in a storing means such as a magnetic tape.

Various recording devices based on various systems can be employed for the above-described purpose, for instance, a device for visualizing optically by scanning a photosensitive material with laser beam, etc., a display means for visualizing electrically on a CRT, etc., a means for printing a radiation image displayed on a CRT by mean of a video printer, and a means for visualizing on heatsensitive recording material using thermic rays.

The present invention also provides a signal processing method in the autoradiography of a sample in which the groups of radioactively lableld substances are arranged in plural rows and distrbuted in a one dimensional direction in each row.

That is, a signal processing method in autoradiography for obtaining information on the one dimensional location of groups of radioactively labeled substances in a sample where the substances of the sample are arranged in plural rows including a reference row and distributed in at least one one dimensional direction in each row on a support medium, in the form of symbols, numerals or combination thereof, which comprises a process including:

(1) generating digital image data where the data comprises sets of digital signals corresponding to the autoradiograph including the rows of distributed substances and where the sets of digital signals respectively represent successive linear portions of the autoradiograph;

(2) scanning selected digital signals of said digital image data to generate further signals representative of predetermined portions of the rows of distributed substances where the positions of said predetermined portions are at least partially determined by their location in the scanning direction and the amount of said radioactively labeled substances at said locations are at least partially determined by the amplitude of said further signals;

(3) processing said further signals with either or both of smoothing and threshold-processing to detect candidate sampling points corresponding to possible locations of certain ones of said substances in each of said rows;

(4) processing said candidate sampling points statistically to determine fundamental sampling points respectively corresponding to actual locations of said certain ones of said substances; and (5) detecting the remaining sampling points in each of said rows based on said fundamental sampling points to obtain said locational informational signals representative of said locational information for said substances in said sample;

(6) said digital image data being generated by (a) causing a stimulable phosphor sheet to absorb radiation energy emitted by said groups of radioactively labeled substances on the support medium to record the autoradiograph of the groups of radioactively labeled substances on the stimulable phosphor sheet, (b) scanning said stimulable phosphor sheet with an electromagnetic wave to release at least a portion of radiation energy stored in said phosphor sheet in the form of the autoradiograph as stimulated emission, (c) detecting said stimulated emission photoelectrically and (d) converting the detected stimulated emission into said digital image data.

The reference row in the above-mentioned signal processing method is not necessarily provided on the support medium, but may be synthesized from the plural resolved rows as described before.

The sample used in the above-mentioned method generally comprises a support medium and groups of radioactively labeled substances, each group being distributed in a one dimensional direction in parallel to form a plurality of rows. The term "parallel" does not necessarily mean a strictly parallel relation in which the plural rows are completely parallel to each other, and includes locally parallel or approximately parallel relations.

In particular, the above-mentioned signal processing method in autoradiography is effectively applicable to analyze the molecular weight, molecular structure or basic unit constitution, of polymeric substances such as proteins, nucleic acids, and derivatives thereof or cleavage products of the protein or their derivatives and the nucleic acids or their derivatives.

Accordingly, the present invention provides a signal processing method in autoradiography for determination of the base sequence of DNA or DNA fragments, employing at least four groups of base specific cleavage products consisting of:

(1) guanine specific cleavage products;

(2) guanine specific cleavage products + adenine specific cleavage products;

(3) tymine specific cleavage products + cytosine specific cleavage products; and (4) cytosine specific cleavage products, which are obtained by specific cleavage of the DNA or DNA fragments which have been labeled with a radioactive element, and resolved respectively in one dimensional directions and in parallel relation to each other to form resolved rows on a support medium, which comprises a process including:

generating digital image data where the data comprises sets of digital signals corresponding to the autoradiograph including the resolved rows and where the sets of digital signals respectively represent successive linear portions of the autoradiograph;

(1) synthesizing an internal reference row from the resolved rows;

(2) scanning selected digital signals of said digital image data to generate further signals representative of predetermined portions of said resolved rows where the positions of said predetermined portions are at least partially determined by their location in the scanning direction and the amount of said radioactively labelled cleavage product at said locations are at least partially determined by the amplitude of said further signals;

(3) processing said further signals with either or both of smoothing and threshold-processing to detect candidate sampling points corresponding to possible locations of certain ones of said cleavage products in each of said rows;

(4) processing said candidate sampling points statistically to determine fundamental sampling points respectively corresponding to actual locations of said certain ones of said cleavage products;

(5) detecting the remaining sampling points on each of the resolved rows based on said fundamental sampling points to obtain signals representative of the location of the remaining cleavage products in each of said resolved rows; and (6) comparing and identifying the positions of said sampling points in each of the resolved rows to obtain locational information on the guanine, adenine, thymine and cytosine, (7) said digital image data being generated by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and (d) converting the detected stimulated emission into said digital image data.

In the signal processing method for determination of the sequence of DNA, it is also possible to provide the internal reference row on the support medium practically by simultaneously resolving the mixture of base specific cleavage products which is obtained by specifically cleaving DNA or DNA fragments at each of the four bases composing the constitutional units thereof, in place of the process comprising synthesis of the internal reference row.

An embodiment of the signal processing in autoradiography employing the signal processing method of the present invention will be described referring to an example of the process for determining the base sequence of DNA.

DNA is in the form of double helix structure consisting of two chain molecules and the two chain molecules are constituted by four constitutional base units, each unit having a base, namely adenine (A), guanine (G), thymine (T), or cytosine (C). The two chain molecules are cross-linked by hydrogen bonding between the four constitutional base units, and the hydrogen bonding between each base comprises only two combinations, namely G-C and A-T. Therefore, if the base sequence of one chain molecule is determined, that of the other chain molecule is naturally determined.

As a representative method for determining the base sequence of DNA utilizing autoradiography, the Maxam-Gilbert method has been known. In this method, a group containing a radioactive isotope of phosphorus (P) is attached to a chain molecule of DNA or a DNA fragment at one end to prepare a radioactively labeled substance, and then the radioactively labeled DNA molecule is specifically cleaved at the constitutional base units by certain chemical reactions. These reactions are called "base specific cleavage reactions". Then the obtained mixture of numerous cleavage products of the DNA or DNA fragment is resolved through gel electrophoresis to give a resolved pattern of the numerous cleavage products (the pattern is not visible).

In the conventional procedure, an X-ray film is exposed to the resolved pattern and developed to obtain a visualized autoradiograph thereon, and then the sequential position of each base from the radioisotopically labeled end of the chain molecules is read by referring to the obtained autoradiograph and the applied base specific chemical reactions so as to determine the sequence of all bases in the substance under investigation.

The signal processing method for the determination of the base sequence of DNA or its derivative, fragment, etc., will be described by an embodiment utilizing the above-mentioned Maxam-Gilbert method, referring to the case of employing the following four groups of base specific cleavage products as a typical combination of base specific cleavage product groups:

(1) guanine (G) specific cleavage products, (2) guanine (G) specific cleavage products+adenine (A) specific cleavage products, (3) thymine (T) specific cleavage products+cytosine (C) specifically cleaved product, (4) cytosine (C) specific cleavage products.

The groups of the above-mentioned base specific cleavage products labeled with $^{32}P$ are resolved (developed) on a gel support medium through electrophoresis in the conventional manner, to obtain a sample. Then, the sample (support medium) is placed on a stimulable phosphor sheet together in layers at room temperature for several minutes to perform the exposure, and the autoradiograph of the sample is recorded and stored in the stimulable phosphor sheet. Details of above-mentioned exposing procedure is described in the aforementioned Japanese Patent Application No. 47(1982)-193418.

Figure 10:
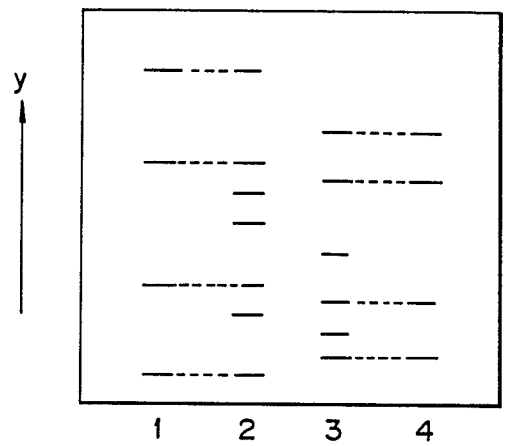
FIG. 10 shows an example of an autoradiograph of a sample in which base specific cleavage products of DNA are resolved on a gel support medium.

FIG. 10 shows an autoradiograph of resolved rows (electrophretic rows) comprising the above-mentioned four groups of radioactively labeled base specific cleavage products formed through resolution. That is, the first to fourth rows shown in FIG. 10 correspond to in order, (1)—(G) specific cleavage products, (2)—(G) specific cleavage products+(A) specific cleavage products, (3)—(T) specific cleavage products+(C) specific cleavage products, (4)—(C) specific cleavage products.

The stimulable phosphor sheet carrying the above autoradiograph of the sample thereon is installed in the read-out system and subjected to the read-out procedure, to obtain the digital image data corresponding to the autoradiograph.

The obtained digital image data is subjected to the digital signal processing in the signal processing circuit 26 as mentioned above.

In the first place, the scanning line for signal processing is determined on each row shown in the autoradiograph of FIG. 10 in the same manner as mentioned above.

In the second place, the scanning with the scanning line is performed on the digital image data, so that a signal is generated in which the position (W) on the scanning line occurs along the abscissa and the signal level (Z) is with respect to the ordinate with respect to each row. The position on the scanning line is preferably represented by the electrophoretic distance between that position and the starting position ($W_{k0}$) of the electrophoresis with respect to each row, wherein k is a positive integer and represents the row number. The starting position is detectable by employing a marker.

The signals which exhibit the higher level (Z) at each corresponding position (W) on the scanning line in comparison between the signals representing the second row and third row, are selectively picked up and combined to obtain a further signal which includes signals concerning all four kinds of base specific cleavage products, i.e., (G) specific cleavage products, (A) specific cleavage products, (T) specific cleavage products and (C) specific cleavage products. The further signal corresponds to an internal reference row (referred to herein as the zeroth row).

In place of carrying out the above-described procedure, an electrophoretic row containing the abovementioned four kinds of base specific cleavage products of DNA can be practically formed simultaneously with others on the support medium, so that said electrophoretic row may be the internal reference row.

The internal reference row is then subjected to smoothing and/or threshold-processing in the same manner as mentioned hereinbefore to obtain candidate sampling points $S_{0n}$ each having an electrophoretic distance ($W_{0n}$), wherein 0 represents the internal reference row, and n is a positive integer and represents the number of the sampling point corresponding to the candidate point.

Subsequently the obtained candidate sampling points $S_{0n}$ are subjected to statistical processing to determine whether each candidate point is a fundamental sampling point. It is reasonablly assumed that if a radioactively labeled substance present at a certain candidate sampling point ($S_{0n}$) on the internal reference row is a certain cleavage product, a radioactively labeled substance present at a candidate sampling point ($S_{0n+1}$) (i.e., a candidate sampling point located in the position adjacently subsequent to the candidate sampling point ($S_{0n}$)) is a cleavage product in which one of four bases is attached to units corresponding to the cleavage product present at the point $S_{0n}$. Moreover, it is experimentally known that the migration distance of each radioactively labeled substance and the logarithm of the molecular weight thereof are in a linear relation. Therefore, the candidate sampling points can be processed statistically by approximating with the following functional equation:

$$W_{0n} = a - b \log(A + M_n) \quad (1)$$

wherein a and b are experimental values determined according to the applied electrophoretic conditions, and A and M are values relating to the molecular weights of the base specific cleavage products of DNA.

By introducing a value representing the migration distance $W_{0n}$ of each candidate sampling point $S_{0n}$ and the number n of the sampling point corresponding to said candidate sampling point into the equation (1), the most probable values $a_0$ and $b_0$ are calculated. Then, $a_0$ and $b_0$ are introduced into the equation (1) to determine the fundamental sampling point $S_{0n}'$ represented by the most probable migration distance ($W_{0n}'$).

Next, based on the thus determined fundamental sampling point $S_{0n}'$, the number of the digital signals which exist within a certain area having as a center the position on the scanning line corresponding to the fundamental sampling point and exhibiting a level not lower than the aforementioned threshold value is obtained through calculation for each fundamental sampling point with respect to each of the four rows. Upon comparison of thus obtained numbers of digital signals for each row, where a suitable threshold-processing is performed repeatedly if desired, the desired sampling points are detected in each row.

According to the above-mentioned processing, each row is represented by the set $\square S_{0n}'\}_k$ of the fundamental sampling point $S_{0n}'$ having the most probable migration distance ($W_{0n}'$). The fundamental sampling points detected in each row are assigned to the desired sampling points.

Figure 11:
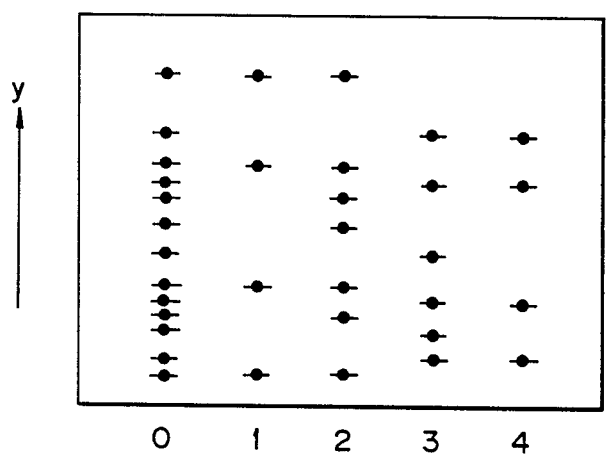
FIG. 11 shows an illustrative scheme indicating the sampling points detected on the resolved rows for the DNA of FIG. 10 by applying thereto the signal processing method of the present invention.

FIG. 11 shows the sampling points in each row in order:

(0)—(G) specific cleavage products+(A) specific cleavage products+(T) specific cleavage products+(C) specific cleavage products;

(1)—(G) specific cleavage products;

(2)—(G) specific cleavage products+(A) specific cleavage products;

(3)—(T) specific cleavage products+(C) specific cleavage products; and (4)—(C) specific cleavage products.

The first row to fourth row are then compared. In more detail, through an operation between the first row having the set of the sampling points $\{S_{On}'\}_1$ and the second row having the set of the sampling points $\{S_{ON}'\}_2$ (namely, logical product operation), $$\overline{\{S_{On}'\}_1} \cap \{S_{On}'\}_2 = \{S_{On}'\}_5$$

an imaginary fifth row having the set of the sampling points $\{S_{On}'\}_5$ is prepared. The thus prepared fifth row has the locational information on adenine alone. The same operation is performed between the third row having the set of the sampling point $\{S_{On}'\}_3$ and the forth row having the set of the sampling point $\{S_{On}'\}_4$ to obtain an imaginary sixth row having another different set of the sampling points $\{S_{On}'\}_6$. The sixth row prepared as mentioned above has the locational information on thymine alone.

By the above-mentioned processing, the information on the one dimensional location of the following four rows is newly obtained:

(1)—(G) specific cleavage products,
(5)—(A) specific cleavage products,
(6)—(T) specific cleavage products,
(4)—(C) specific cleavage products.

Otherwise, the detection of the sampling points for each row of different base specific cleavage products can be also performed according to the present invention as described below.

After obtaining the signal in which the position is plotted against abscissa and the signal level is plotted against ordinate as in FIG. 8, for example, the signal being represented by the function $f_k(W)$ concerning each of the resolved rows (1) through (4), wherein k is a positive integer and represents the row number, the following numerical operation (subtraction) is performed between the function $f_1(W)$ of the first row and the function $f_2(W)$ of the second row;

$$f_2(W) - f_1(W) = f_5(W)$$

to obtain an imaginary fifth row represented with $f_5(W)$. The fifth row corresponds to an imaginary row consisting essentially of only adenine specific cleavage products.

Figure 12A:
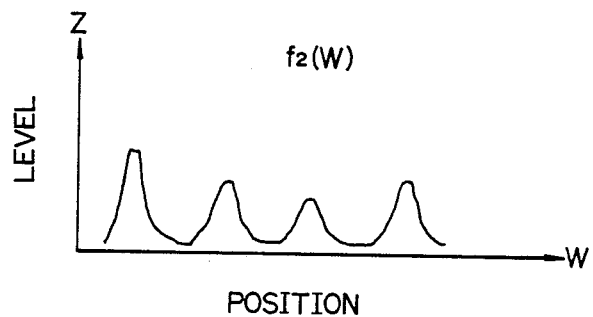
FIGS. 12-(a) and 12-(b) are graphs both showing relationships between position on the scanning line and level of digital signal in said position with respect to the second row and the first row, respectively.
Figure 12B:
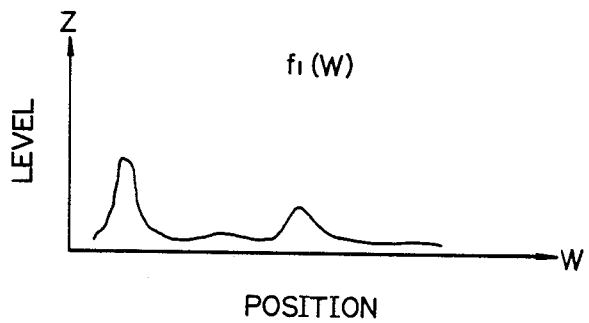
Figure 12C:
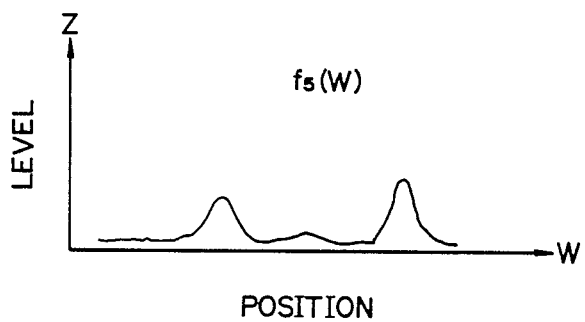
Figure 13A:
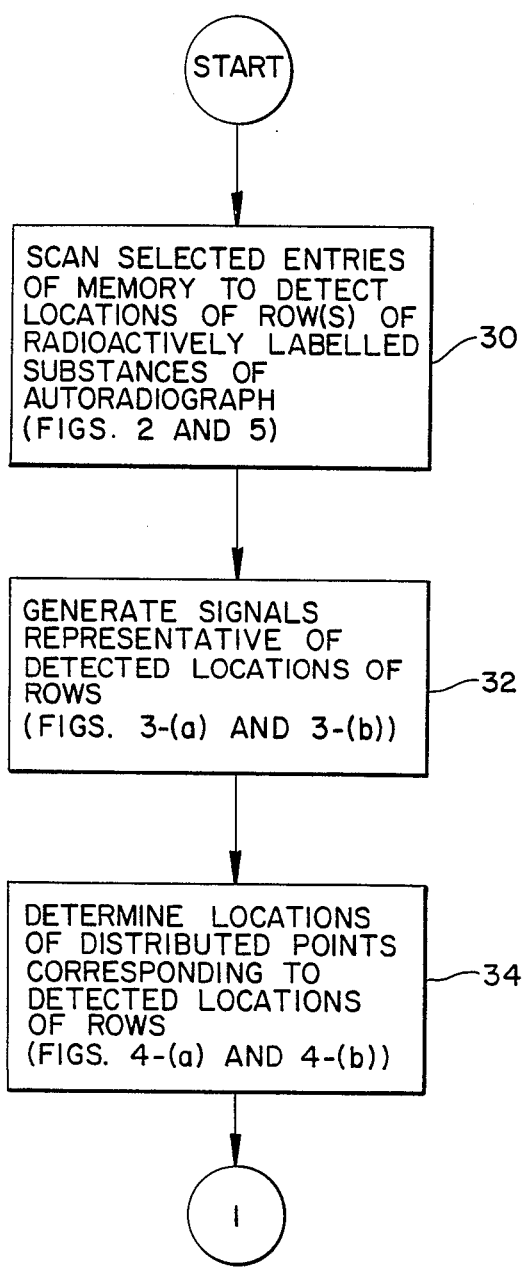
Figure 13B:
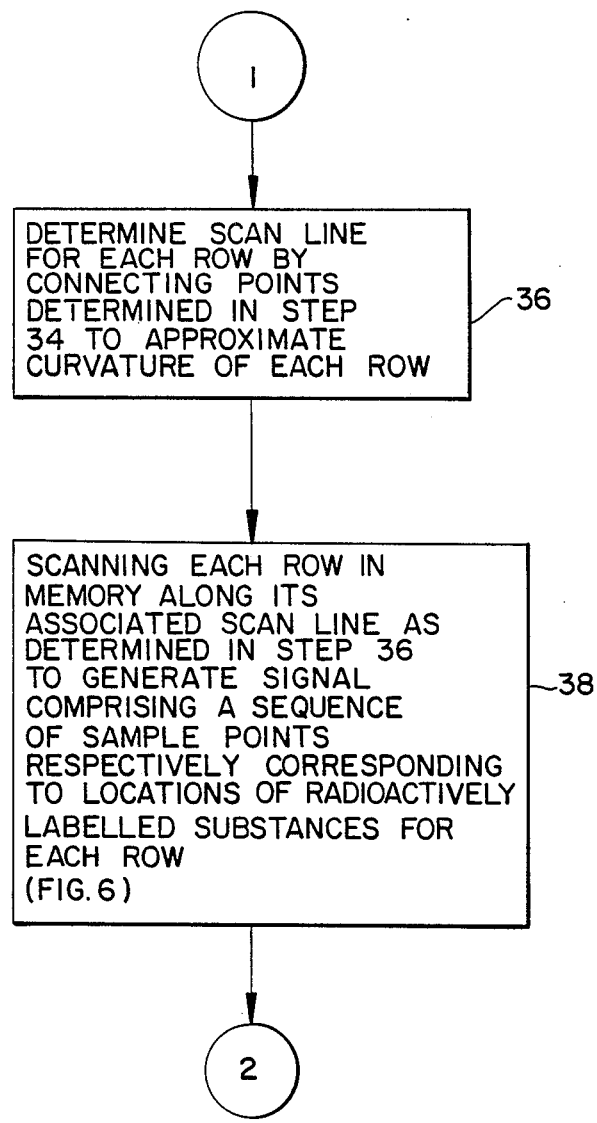
Figure 13C:
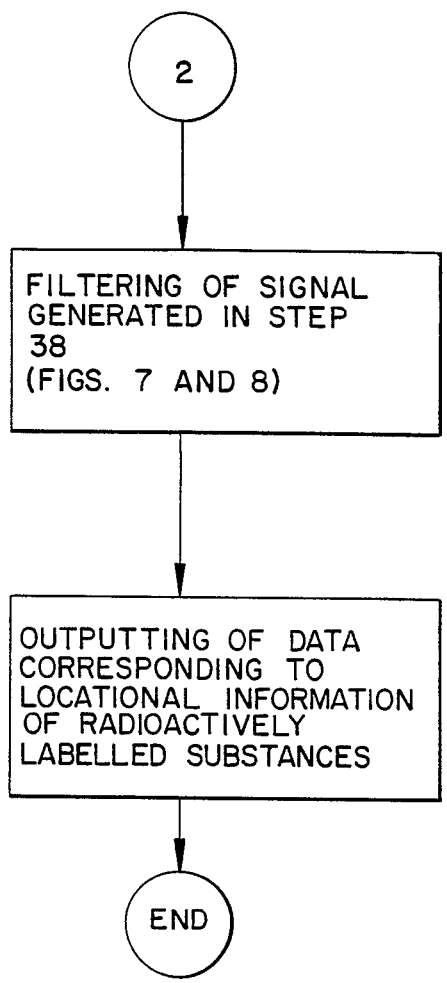

FIG. 12 graphically shows the above operation. That is, the graphs (a), (b) and (c) of FIG. 12 correspond to the second, first and fifth rows, respectively.

When the signal level is different between the resolved rows to be operated numerically, the signal is preferably adjusted to have similar levels, for instance, by setting the amplification degree for each resolved row according to the information obtained in the preliminary read-out operation.

The same subtraction is performed between the third row and the forth row to obtain an imaginary sixth row which is represented by $f_6(W)$ and corresponds to thymine specific cleavage products alone. Thus, the following four rows (including the calculated rows) consisting essentially of different kinds of respective base specific cleavage products, not of mixtures thereof are obtained:

(1)—(G) specific cleavage products,
(5)—(A) specific cleavage products,
(6)—(T) specific cleavage products,
(4)—(C) specific cleavage products.

As described above, the present invention also provides a signal processing method in autoradiography for determining the base sequence of DNA or a DNA fragment employing at least two groups of base specific cleavage products or mixtures thereof comprising:

(1) single base specific cleavage products or a mixture of two or three kinds of base specific cleavage products selected from the group consisting of guanine specific cleavage products, adenine specific cleavage products, thymine specific cleavage products and cytosine specific cleavage products; and (2) a mixture of two, three or four kinds of base specific cleavage products containing at least one kind of the base specific cleavage products included in the above group (1), which are obtained by specific cleavage of the DNA or a DNA fragment which has been labeled with a radioactive element, and resolved respectively in one dimensional directions and in parallel relation to each other to form resolved rows on a support medium, which comprises a process including:

(1) operating numerically between the resolved row of the above group (1) and the resolved row of the above group (2) with respect to the corresponding positions on each scanning line to obtain a calculated resolved row;

(2) determining sampling points with respect to said calculated resolved row;

said process being applied to digital signals corresponding to an autoradiograph having the locational information on the groups of radioactively labeled cleavage products, said digital signal being obtained by causing a stimulable phosphor sheet to absorb radiation energy emitted by said groups of radioactively labeled cleavage products on the support medium to record the autoradiograph of the groups of radioactively labeled cleavage products on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically.

The sampling points can be efficiently detected by comparing the digital signals among the above four rows based on the fundamental sampling point $S_{On}'$ in a synthesized internal reference row which is represented by the step $\{S_{On}'\}_k$ of the fundamental sampling point $S_{On}'$ having the most probable migration distance ($W_{On}'$). It is also possible to detect the sampling points not by using the fundamental sampling points, but by processing each function $f_k(W)$ corresponding to the above four rows with the smoothing through convolution and subsequently with threshold-processing as described hereinbefore.

Therefore, the fundamental sampling point $S_{On}'$ is replaced as follows:

(i) the sampling points which belong to $\{S_{On}'\}_1$ is replaced with G;

(ii) the sampling points which belong to $\{S_{On}'\}_4$ is replaced with C;

(iii) the sampling points which belong to $\{S_{On}'\}_5$ is replaced with A;

(iv) the sampling points which belong to $\{S_{On}'\}_6$ is replaced with T, and subsequently arranged in order of the sampling number n to obtain the following arrangement.

G-C-G-C-A-A-T-G-C-

Thus, the base sequence of one chain molecule of DNA can be determined.

According to the signal processing method of the present invention, the base sequence of DNA can be also determined using the following most simple combination of base specific cleavage products:

(1)—(G) specific cleavage products,
(2)—(A) specific cleavage products,
(3)—(T) specific cleavage products,
(4)—(C) specific cleavage products.

The above four groups are that combination where each is exclusive from each other. Accordingly, by utilizing the exclusiveness that there absolutely exists only one group of base specific cleavage products in the vertical direction of the resolved rows of the above four groups, the locational relation of the bases can be determined by reasonable judgement of the obtained digital signal on a basis of decision by majority. It suggests that the sequence of DNA according to the present invention could be determined more exactly than by the conventional visual judgement.

In more detail, concerning the digital signals corresponding to the autoradiograph of the resolved pattern comprising the four resolved rows of the above groups of base specific cleavage products, which is obtained by employing the aforementioned radiation image recording and reproducing method, the scanning lines for detecting the sampling points are deterimined, as well as the internal reference row is obtained by synthesizing the four resolved rows, and the fundamental sampling points in the internal reference row are determined, as described above. The internal reference row, as mentioned hereinbefore, may be practically provided on the support medium in place of synthesis of the digital image data.

Then, based on the determined fundamental sampling point $S_{On}'$ having the most probable migration distance ($W_{On}'$), the number of the digital signals which exist within a certain area having as a center the position on each scanning line corresponding to the fundamental sampling point and exhibiting a level not lower than the threshold value is calculated for each fundamental sampling point on the respective four rows. That is, a certain area (sampling mask) with the center at the position ($W_{On}'$) is fixed for each fundamental sampling point $S_{On}'$ and the number of signals existing within each sampling mask and occurring on each scanning line and having a level higher than the threshold value is calculated.

Since the groups of base specific cleavage products contained in the above four resolved rows respectively are exclusive of each other, the number of the fundamental sampling points is necessarily equal to the sum of sampling points to be detected in the four rows. This means that one sampling point corresponding to one fundamental sampling point is detected in any one of the four rows. That is, the desired sampling point for the same sampling mask must be detected only in one of the four rows.

Accordingly, by utilizing the above-mentioned exclusiveness among the rows, a row which exhibits the highest estimated value for the signal level with respect to the sampling masks of the same fundamental sampling point is selected, so as to decide that the sampling point corresponding to said fundamental sampling point is present in said row and absent in the other three rows. The estimated value for the signal level means an integral value of the signal levels included in the mask, or the number of signals whose level exceeds the threshold value in the case of performing threshold processing. Thus, the sampling points for all the sampling masks are detected in any one of the four electrophoretic rows, respectively, namely, the sampling points corresponding to the fundamental sampling points in the internal reference row are detected in any one of the four rows.

According to the above-mentioned processing, each row is represented by the set $\{S_{On}'\}_k$ of the fundamental sampling point $S_{On}'$, wherein k represents the row number. The fundamental sampling point $S_{On}'$ is replaced with any one of the symbol G, A, T, C based on the row number k, and subsequently arranged in order of the sampling number n to obtain the base sequence of one chain molecule of DNA represented by the following arrangement:

G-C-G-C-A-A-T-G-C-

The representation mode of the information on the base sequence of DNA obtained as described hereinbefore is by no means limited to the above-mentioned representation mode, and other representation modes are optionally employable. For instance, the relative amount of resolved base specific cleavage products can be also obtained for representation by processing the signal level on the scanning line with an optional operation, if desired.

Further, the base sequence of both chain molecules of DNA can be represented. That is, by giving the information on the combination between the four bases, namely A-T and G-C, the sequence of DNA is represented by the following scheme.

G-C-G-C-A-A-T-G-C-

C-G-C-G-T-T-A-C-G-

The method for detemining the base sequence of DNA utilizing the aforementioned combinations of (G, G+A, T+C, C) and (G, A, T, C) is one example of the determination of the base sequence of DNA, and the signal processing of the present invention is by no means limited to the above combinations, but various combinations are employable. The combination of at least one group of base specific cleavage products and a suitable reference substance (for example, a mixture of all base specific cleavage products) is employable to determine the sequence of the specific base.

In the above-mentioned examples the present invention was described by using four rows of the radioactively labeled substances resolved one-dimensionally on the support medium, but the number of resolved rows is by no means limited to four, and may be more or less than four. Further, according to the present invention, the base sequence of two or more DNA molecules can be determined simultaneously using a single support medium.

The information on the base sequence of DNA determined by the above-mentioned signal processing is output from the signal processing circuit 26, and can be subsequently recorded using the aforementioned recording devices or the like.

It is further possible to perform genetic philological information processing such as a comparison between the obtained base sequence of the DNA and the base sequence of another DNA which has been already recorded and stored in a suitable place.

We claim:

1. A signal processing method for processing an autoradiograph recorded on a support medium and containing locational information on the one dimensional location of radioactively labeled substances in a sample where the substances are distributed in at least one one dimensional direction on said support medium to form at least one row of the distributed substances, which comprises the steps of:

(1) generating digital image data where the data comprises sets of digital signals corresponding to the autoradiograph including the row of distributed substances;

(2) scanning said digital image data in at least two different positions in such a manner that each scanning selects certain ones of said digital signals corresponding to the row of distributed substances to obtain relationships between positions of said certain ones of the digital signals in the direction of the scanning and the signal levels at said positions;

(3) generating at least two distributed point signals based on said relationships where the two distributed point signals are generated for said row of distributed substances, the two distributed point signals respectively corresponding to the two different scanning positions and where said two distributed points are disposed on said row;

(4) generating a signal corresponding to a continuous line selected from the group consisting of a straight line, a curved line and a polygonal line connecting said points on the row where said continuous line corresponds to a scanning line for detection of sampling points respectively corresponding to the locations of said substances;

(5) scanning said digital image data along said scanning line to obtain locational information signals representative of said locational information for each of said substances in said sample;

(6) said digital image data being generated by (a) causing a stimulable phosphor sheet to absorb radiation energy emitted by the radioactively labeled substances on the support medium to record the autoradiograph of the radioactively labeled substances on the stimulable phosphor sheet, (b) scanning said stimulable phosphor sheet with an electromagnetic wave to release as stimulated emission at least a portion of the radiation energy absorbed by said phosphor sheet in the form of the autoradiograph, (c) detecting said stimulated emission photoelectrically, and (d) converting the detected stimulated emission into said digital image data; and whereby said locational information signals can be obtained in spite of one or more deviations of said row of said distributed substances from a straight line due to the compensation effected by said scanning line for said deviations where said deviations may be present in the support medium and/or the stimulable phosphor sheet.

2. The signal processing method in autoradiography as claimed in claim 1, wherein the scanning of the digital image data in at least two different positions is carried out in parallel.

3. The signal processing method in autoradiography as claimed in claim 1 or 2, wherein the width of said scanning on the digital image data is set prior to the signal processing where the number of said selected certain ones of the digital signals is so chosen as to be at least equal to the number of digital signals corresponding to one of said radioactively labeled substances to thus set the width of the scanning.

4. The signal processing method in autoradiography as claimed in claim 1 or 2, where said continuous line is a straight line.

5. The signal processing method in autoradiography as claimed in claim 1 or 2, wherein said radioactively labeled substances arranged to form a row of distributed substances on the support medium are biopolymers, derivatives thereof, or cleavage products of either said biopolymers or said derivatives thereof, labeled with a radioactive element and resolved in said one dimensional direction on the support medium.

6. The signal processing method in autoradiography as claimed in claim 5, wherein said biopolymers are nucleic acids, derivatives thereof or cleavage products of either said nucleic or said derivatives thereof.

7. A signal processing method for processing an autoradiograph recorded on a support medium and containing locational information on the one dimensional location of radioactively labeled substances in a sample where the substances are distributed in at least one one dimensional direction on said support medium to form at least one row of the distributed substances, and locational informational signals in the form of symbols, numerals, or a combination thereof are obtained regarding said locational information, which comprises a process including:

(1) generating digital image data where the data comprises sets of digital signals corresponding to the autoradiograph including the row of distributed substances;

(2) scanning selected digital signals of said digital image data to generate at least one further signal representative of a predetermined portion of said one row of distributed substances where the position of said portion is at least partially determined by its location in the scanning direction and the amount of said radioactively labeled substance at said location is at least partially determined by the amplitude of said further signal;

(3) processing said further signal to detect at least one sampling point correspond to the location of said predetermined portion of said one row of distributed substances;

(4) processing said digital image data, in response to said processed further signal, to obtain at least one of said locational informational signals representative of said locational information for at least one of said substances in said sample;

(5) said digital image data being generated by (a) causing a stimulable phosphor sheet to absorb radiation energy emitted by said radioactively labeled substances on the support medium to record the autoradiograph of the radioactively labeled substances on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and (d) converting the detected stimulated emission into said digital image data.

8. The signal processing method in autoradiography as claimed in claim 7, wherein said smoothing is performed by convolution of the further signal with a filter function.

9. The signal processing method in autoradiography as claimed in claim 7 or 8, wherein the location of the maximum value of the smoothed, further signal corresponds to said sampling point.

10. The signal processing method in autoradiography as claimed in claim 7 or 8, wherein the middle point of said processed, further signal corresponds to said sampling point.

11. The signal processing method in autoradiography as claimed in claim 10, wherein the threshold value for said threshold-processing is determined based on a histogram.

12. The signal processing method in autoradiography as claimed in claim 7 or 8, wherein said radioactively labeled substances distributed on the support medium are biopolymers, derivatives thereof, or cleavage products of either said biopolymers or said derivatives thereof, labeled with a radioactive element.

13. A signal processing method for processing an autoradiograph recorded on a support medium and containing the locational information on the one dimensional location of groups of radioactively labeled substances in a sample where the substances are arranged in plural rows including a reference row where each row is distributed in at least one one dimensional direction on said support medium, and locational informational signals in the form of symbols, numerals or a combination thereof are obtained regarding said locational information, which comprises a process including:

(1) generating digital image data where the data comprises sets of digital signals corresponding to the autoradiograph including the rows of distributed substances;

(2) scanning selected digital signals of said digital image data to generate further signals representative of predetermined portions of said rows of distributed substances where the positions of said portions are at least partially determined by their location in the scanning direction and the amounts of said radioactivity labeled substances at said locations are at least partially determined by the amplitudes of said further signals;

(3) processing said further signals to detect candidate sampling points corresponding to possible locations of certain ones of said substances in each of said rows;

(4) processing said candidate sampling points statistically to determine fundamental sampling points respectively corresponding to actual locations of said certain ones of said substances;

(5) detecting the remaining sampling points in each of said rows based on said fundamental sampling points to obtain said locational informational signals representative of said locational information for the remaining ones of said substances in each of said rows in said sample; and (6) said digital image data being generated by (a) causing a stimulable phosphor sheet to absorb radiation energy emitted by said groups of radioactively labeled substances on the support medium to record the autoradiograph of the groups of radioactively labeled substances on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and converting the detected stimulated emission into said digital image data.

14. The signal processing method in autoradiography as claimed in claim 13, wherein said radioactively labeled substances distributed on the support medium are biopolymers, derivatives thereof, or cleavage products of either said biopolymers or said derivatives thereof, labeled with a radioactive element.

15. The signal processing method in autoradiography as claimed in claim 14, wherein said biopolymers are nucleic acids, derivatives thereof or cleavage of either said nucleic acids or said derivatives products thereof; and said symbols, numerals or a combination thereof; obtained by said signal processing method represents a base sequence of said biopolymers.

16. A signal processing method for processing an autoradiograph recorded on a support medium and containing locational information on the one dimensional location of groups of radioactively labeled substances in a sample where the substances are arranged in plural rows where each row is distributed in at least one one dimensional direction on said support medium, and locational informational signals in the form of symbols, numerals or a combination thereof are obtained regarding said locational information, which comprises a process including:
(1) generating digital image data where the data comprises sets of digital signals corresponding to the autoradiograph including the rows of distributed substances;
(2) synthesizing a reference row from said plural rows of distributed substances,
(3) scanning selected digital signals of said digital image data to generate further signals representative of predetermined portions of said rows of distributed substances where the positions of said portions are at least partially determined by their locations in the scanning direction and the amounts of said radioactively labeled substances at said locations are at least partially determined by the amplitude of said further signals;
(4) processing said further signals to detect candidate sampling points corresponding to possible locations of certain ones of said substances in each of said rows;
(5) processing said candidate sampling points statistically to determine fundamental sampling points respectively corresponding to actual locations of said certain ones of said substances; and
(6) detecting the remaining sampling points in each of said rows based on said fundamental sampling points to obtain said locational informational signals representative of said locational information for the remaining ones of said substances in each of said sample;

said digital image data being generated by (a) causing a stimulable phosphor sheet to absorb radiation energy emitted by said groups of radioactively labeled substances on the support medium to record the autoradiograph of the groups of radioactively labeled substances on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and (d) converting the detected stimulated emission into said digital image data.

17. The signal processing method in autoradiography as claimed in claim 16, wherein aid radioactively labeled substances distributed on the support medium are biopolymers, derivatives thereof, or cleavage products of either said biopolymers or said derivatives thereof, and said symbols, numerals, or a combination thereof obtained by said signal processing method represents a base sequence of said biopolymers.

18. The signal processing method in autoradiography as claimed in claim 17, wherein said biopolymers are nucleic acids, derivatives thereof or cleavage products thereof, and said symbol, numeral or combination thereof obtained by said signal processing represents base sequence thereof.

19. A signal processing method for processing an autoradiograph recorded on a support medium and containing a base sequence of DNA or a DNA fragment, employing at least five groups of base specific cleavage products comprisng:
(1) a mixture of guanine specific cleavage products, adenine specific cleavage products, thymine specific cleavage products and cytosine specific cleavage products;
(2) guanine specific cleavage products;
(3) a mixture of guanine specific cleavage products and adenine specific cleavage products;
(4) a mixture of thymine specific cleavage products and cytosine specific cleavage products; and
(5) cytosine specific cleavage products, which are obtained by specific cleavage of the DNA or DNA fragment which has been labeled with a radioactive element where each of said groups is resolved in at least one one dimensional direction so that said groups are in substantial parallel relation to each other to form resolved rows on the support medium, said signal processing method including the steps of:
(1) generating digital image data where the data comprises sets of digital signals corresponding to the autoradiograph including the row of cleavage products;
(2) utilizing an internal reference row comprising the resolved row of said mixture (1) of base specific cleavage products;
(3) scanning selected digital signals of said digital image data to generate further signals representative of predetermined portions of said rows of cleavage products where the positions of said portions are at least partially determined by their locations in the scanning direction and the amounts of said radioactively labeled cleavage products at said locations are at least partially determined by the amplitudes of said further signals;
(4) processing said further signals to detect candidate sampling points corresponding to possible locations of certain ones of said cleavage products in each of said rows;
(5) processing said candidate sampling points statistically to determine fundamental sampling points respectively corresponding to actual locations of said certain ones of said cleavage products;
(6) detecting the remaining sampling points in each of said resolved rows based on said fundamental sampling points to obtain signals representative of the locations of the remaining cleavage products in said sample; and
(7) comparing and identifying the positions of said sampling points in each of the resolved rows to obtain locational information on said guanine, adenine, thymine and cytosine,
(8) said digital image data being generated by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and (d) converting the detected stimulated emission into said digital image data.

20. The signal processing method in autoradiography as claimed in claim 19, wherein said statistical processing of the candidate sampling points to determine the fundamental sampling points comprises the steps of:

(1) approximating said candidate sampling points with the following equation (1):

$$W_{On} = a - b \log (A + M_n) \quad (1)$$

wherein $W_{On}$ represents the distance between one of the candidate sampling points on one of the resolved rows and the starting point of the resolved row, n represents the number of the sampling point corresponding to said one candidate point, and A and M are constant values, where a and b are calculated by substituting values of $W_{On}$ and n into Equation (1) to solve at least two equations with two unknowns—namely a and b; and (2) determining the fundamental sampling points using the equation (1) with the calculated values of a and b.

21. A signal processing method for processing an autoradiograph recorded on a support medium and containing a base sequence of DNA or a DNA fragment, employing at least four groups of base specific cleavage products consisting of:

(1) guanine specific cleavage products;
(2) a mixture of guanine specific cleavage products and adenine specific cleavage products;
(3) a mixture of thymine specific cleavage products; and
(4) cytosine specific cleavage products, which are obtained by specific cleavage of the DNA or DNA fragment which has been labeled with a radioactive element where each of said groups is resolved in at least one one dimentional direction so that said groups are in substantial parallel relation to each other to form resolved rows on the support medium, said signal processing method including the steps of:

(1) generating digital image data where the data comprises sets of digital signals corresponding to the autoradiograph including the rows of cleavage products:
(2) synthesizing an internal reference row from the resolved rows;
(3) scanning selected digital signals of said digital image data to generate further signals representative of predetermined portions of said rows of cleavage products where the positions of said portions are at least partially determined by their locations in the scanning direction and the amounts of said radioactively labeled cleavage products at said locations are at least partially determined by the amplitudes of said further signals:
(4) processing said further signals to detect candidate sampling points corresponding to possible locations of certain ones of said cleavage products in each of said rows;
(5) processing said candidate sampling points statistically to determine fundamental sampling points respectively corresponding to actual locations of said certain ones of said cleavage products;
(6) detecting the remaining sampling points in each of the resolved rows based on said fundamental sampling points to obtain signals representative of the locations of the remaining cleavage products in said sample;
(7) comparing and identifying the positions of said sampling points on the resolved rows to obtain locational information on said guanine, adenine, thymine and cytosine,
(8) said digital image data being generated by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of radiation energy stored in said phosphor sheet in the form of the autoradiograph, (c) detecting said stimulated emission photoelectrically and (d) converting the detected stimulated emission into said digital image data.

22. The signal processing method in autoradiography as claimed in claim 21, wherein said statistical processing for the candidate sampling points to determine the fundamental sampling points comprises the steps of:

(1) approximating each candidate sampling point with the following equation (1):

$$W_{On} = a - b \log (A + M_n) \quad (1)$$

wherein $W_{On}$ represents the distance between one of the candidate sampling points on one of the resolved rows and the starting point of the resolved row, n represents the number of the sampling point corresponding to said one condidate point, and A and M are constant values, where a and b are calculated by substituting values of $W_{On}$ and n into Equation (1) to solve at least two equations with two unknowns—namely a and b; and (1) determining the fundamental sampling points using the equation (1) with the calculated values of a and b.

23. A signal processing method for processing an autoradiograph recorded on a support medium and containing base sequence of DNA or a DNA fragment, employing at least four groups of base specific cleavage products respectively consisting of:

(1) guanine specific cleavage products;
(2) adenine specific cleavage products;
(3) thymine specific cleavage products; and
(4) cytosine specific cleavage products, which are obtained by specific cleavage of the DNA or DNA fragment which has been labeled with a radioactive element where each of said groups is resolved in at least one one dimensional direction so that said groups are in substantial parallel relation to each other to form at least four resolved rows on a support medium, said signal processing method including the steps of:

(1) generating digital image data where the data comprises sets of digital signals corresponding to the autoradiograph including the row of distributed substances;
(2) synthesizing a signal representative of an internal reference row from the digital image data representing said resolved rows where said internal reference row includes candidate sampling points for all four groups of said base specific cleavage products and determining fundamental sampling points respectively corresponding to said candidate sampling points with respect to said internal reference row; and (3) analyzing the digital signals representative of the radioactively labeled cleavage products present within a sampling mask corresponding to a predetermined area and movable along each of said four resolved rows to positions respectively corresponding to the positions of the fundamental sampling points on the internal reference row to detect sampling points in each resolved row by utilizing the exclusiveness of the sampling points corresponding to each group in each row;

(4) said digital image data being obtained by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of the radiation energy stored in said phosphor sheet in the form of the autoradiograph, (c) detecting said stimulated emission photoelectrically, and (d) converting the detected stimulated emission into said digital image data.

24. The signal processing method in autoradiography as claimed in claim 23, wherein said fundamental sampling points in each resolved rows are detected by subjecting the digital signals to smoothing, threshold-processing and statistical processing.

25. A signal processing method for processing an autoradiograph recorded on a support medium and containing a base sequence of DNA or a DNA fragment, employing at least four groups of base specific cleavage products respectively consisting of:
(1) guanine specific cleavage products;
(2) adenine specific cleavage products;
(3) thymine specific cleavage products; and
(4) cytosine specific cleavage products,
which are obtained by specific cleavage of the DNA or DNA fragment which has been labeled with a radioactive element where each of said groups is resolved in at least one one dimensional direction so that said groupd are in substantial parallel relation to each other to form at least four resolved rows on a support medium, said signal processing method including the steps of:
(1) generating digital image data where the data comprises sets of digital signals corresponding to the autoradiograph including the row of distributed substances;
(2) determining fundamental sampling points with respect to an internal reference row, said internal reference row comprising the resolved row of said mixture (5) of base specific cleavage products; and
(3) analyzing the digital signals representative of the radioactively labeled cleavage products present within a sampling mask corresponding to a predetermined area and movable along at least certain ones of said resolved rows to positions respectively corresponding to the positions of the fundamental sampling points on the internal reference row to detect sampling points in each resolved row by utilizing the exclusiveness of the sampling points corresponding to each group in each row;

(4) said digital image data being obtained by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of the radiation energy stored in said phosphor sheet in the form of the autoradiograph, (c) detecting said stimulated emission photoelectrically, and (d) converting the detected stimulated emission into said digital image data.

26. The signal processing method in autoradiography as claimed in claim 25, wherein said fundamental sampling points in each resolved rows are detected by subjecting the digital signals to smoothing, threshold-processing and statistical processing.

27. A signal processing method for processing an autoradiograph recorded on a support medium and containing that base sequence of DNA or a DNA fragment, employing at least two groups of base specific cleavage products respectively comprising:
(1) single base specific cleavage products or a mixture of two or three kinds of base specific cleavage products selected from the group consisting of guanine specific cleavage products, adenine specific cleavage products, thymine specific cleavage products and cytosine specific cleavage products; and
(2) a mixture of two, three or four kinds of base specific cleavage products containing at least one kind of the base specific cleavage products included in the above group (1),
which are obtained by specific cleavage of the DNA or DNA fragment which has been labeled with a radioactive element where each of said groups is resolved in at least one one dimensional direction so that said groups are in substantial parallel relation to each other to form at least two resolved rows respectively containing groups (1) and (2) on a support medium, said signal processing method including the steps of:
(1) generating digital image data where the data comprises sets of digital signals corresponding to the autoradiograph including the row of distributed substances;
(2) operating on the digital signals representing the resolved row of the above group (1) and the resolved row of the above group (2) with respect to the corresponding positions on each resolved row to obtain a mathematically constructed resolved row; and
(3) determining sampling points with respect to said constructed resolved row;
(4) said digital image data being obtained by (a) causing a stimulable phosphor sheet to absorb radiation energy emitted by said groups of radioactively labeled cleavage products on the support medium to record the autoradiograph of the groups of radioactively labeled cleavage products on the stimulable phosphor sheet, (b) scanning said stimulable phosphor sheet with an electromagnetic wave to release as stimulated emission at least a portion of the radiation energy stored in said phosphor sheet in the form of the autoradiograph, (c) detecting said stimulated emission photoelectrically and (d)

converting the detected stimulated emission into said digital image data.

28. The signal processsing method in autoradiography as claimed in claim 27, wherein said sampling points are determined by subjecting the digital signals corresponding to each said constructed resolved row to smoothing and/or threshold-processing.

29. The signal processing method in autoradiography as claimed in claim 27 or 28, wherein said group (2) consists essentially of a combination of the base specific cleavage products of said group (1) and another kind of base specific cleavage product, and said operation in step (2) is performed by subtraction.

30. The signal processing method in autoradiography as claimed in claim 29, wherein the combination of said group (1) and said group (2) is selected from the combinations consisting of (A):
  (1) guanine specific cleavage products; and
  (2) a mixture of guanine specific cleavage products and adenine specific cleavage products, (B)
  (1) cytosine specific cleavage products; and
  (2) a mixture of thymine specific cleavage products; and
  cytosine specific cleavage products or (C) a mixture of combinations (A) and (B).

31. The signal processing method as in claims 1, 7, 13, 16, 19, 21, 23, 25 or 27, wherein said digital image data is stored in a memory 32. The signal processing method of claims 7, 13, 16, 19 or 21 where said processing of the further signal includes subjecting the further signal to threshold processing.

33. The signal processing method of claim 32 where said signal processing includes smoothing the further signal.

* * * * *